United States Patent
Wei

(10) Patent No.: US 12,424,881 B2
(45) Date of Patent: Sep. 23, 2025

(54) SENDING, RECEIVING, AND SENDING AND RECEIVING METHODS AND APPARATUSES FOR WIRELESS CHARGING-RELATED INFORMATION

(71) Applicant: BEIJING XIAOMI MOBILE SOFTWARE CO., LTD., Beijing (CN)

(72) Inventor: Hong Wei, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 22 days.

(21) Appl. No.: 18/289,786

(22) PCT Filed: May 10, 2021

(86) PCT No.: PCT/CN2021/092868
§ 371 (c)(1),
(2) Date: Nov. 7, 2023

(87) PCT Pub. No.: WO2022/236617
PCT Pub. Date: Nov. 17, 2022

(65) Prior Publication Data
US 2024/0258839 A1 Aug. 1, 2024

(51) Int. Cl.
*H02J 50/80* (2016.01)
*H04W 36/00* (2009.01)
*H04W 36/08* (2009.01)

(52) U.S. Cl.
CPC ......... *H02J 50/80* (2016.02); *H04W 36/0058* (2018.08); *H04W 36/008357* (2023.05); *H04W 36/08* (2013.01)

(58) Field of Classification Search
CPC ....................................................... H02J 50/80
USPC ....................................................... 307/104
See application file for complete search history.

(56) References Cited

U.S. PATENT DOCUMENTS

| | | | |
|---|---|---|---|
| 2017/0288739 A1 | 10/2017 | Shin et al. | |
| 2018/0301925 A1* | 10/2018 | Wang | H02J 7/0071 |
| 2019/0190291 A1* | 6/2019 | Waters | B64C 11/006 |

FOREIGN PATENT DOCUMENTS

| | | |
|---|---|---|
| CN | 103384952 A | 11/2013 |
| CN | 105493529 A | 4/2016 |

OTHER PUBLICATIONS

PCT/CN2021/092868 International Search Report dated Dec. 1, 2021, 2 pages.
European Patent Application No. 21941193.1 Search Report dated Feb. 4, 2025, 12 pages.

* cited by examiner

*Primary Examiner* — Joseph Chang
(74) *Attorney, Agent, or Firm* — Cozen O'Connor

(57) ABSTRACT

A method for sending wireless charging related information. The method includes: sending wireless charging-related information of a terminal to a core network. The wireless charging-related information may be communicated between base stations during cell handover of the terminal from one base station to another.

20 Claims, 8 Drawing Sheets

```
in response to determining that a terminal performing wireless
charging needs to perform cell handover, sending wireless           ──── S101
charging related information of the terminal to the core network
                                │
                                ▼
receiving a wireless charging configuration configured for the      ──── S301
terminal by a second base station sent by the core network
                                │
                                ▼
sending the wireless charging configuration configured for the      ──── S302
terminal by the second base station to the terminal
```

```
┌─────────────────────────────────────────────────────────┐
│ in response to determining that a terminal performing   │
│ wireless charging needs to perform cell handover,       │──── S101
│ sending wireless charging related information of the    │
│ terminal to a core network                              │
└─────────────────────────────────────────────────────────┘
                          FIG. 1
```

```
┌─────────────────────────────────────────────────────────┐
│ receiving a measure report sent by the terminal, in     │
│ which the measure report includes signal quality        │
│ information of at least one candidate base station;     │──── S201
│ and/or obtaining wireless charging capability           │
│ information of the at least one candidate base station  │
└─────────────────────────────────────────────────────────┘
                          ▼
┌─────────────────────────────────────────────────────────┐
│ determining the second base station in the at least one │
│ candidate base station based on the signal quality      │
│ information of the at least one candidate base station  │──── S202
│ and/or the wireless charging capability information of  │
│ the at least one candidate base station                 │
└─────────────────────────────────────────────────────────┘
                          ▼
┌─────────────────────────────────────────────────────────┐
│ in response to determining that a terminal performing   │
│ wireless charging needs to perform cell handover,       │──── S101
│ sending wireless charging related information of the    │
│ terminal to the core network                            │
└─────────────────────────────────────────────────────────┘
                          FIG. 2
```

```
┌─────────────────────────────────────────────────────────┐
│ in response to determining that a terminal performing   │
│ wireless charging needs to perform cell handover,       │──── S101
│ sending wireless charging related information of the    │
│ terminal to the core network                            │
└─────────────────────────────────────────────────────────┘
                          ▼
┌─────────────────────────────────────────────────────────┐
│ receiving a wireless charging configuration configured  │
│ for the terminal by a second base station sent by the   │──── S301
│ core network                                            │
└─────────────────────────────────────────────────────────┘
                          ▼
┌─────────────────────────────────────────────────────────┐
│ sending the wireless charging configuration configured  │
│ for the terminal by the second base station to the      │──── S302
│ terminal                                                │
└─────────────────────────────────────────────────────────┘
                          FIG. 3
```

SENDING, RECEIVING, AND SENDING AND RECEIVING METHODS AND APPARATUSES FOR WIRELESS CHARGING-RELATED INFORMATION

CROSS-REFERENCE TO RELATED APPLICATION

This application is a U.S. national phase application of International Application No. PCT/CN2021/092868, filed on May 10, 2021, the content of which is hereby incorporated by reference in its entirety.

TECHNICAL FIELD

The present disclosure relates to a field of communication technologies, and in particular, to a method and apparatus for sending wireless charging related information, a method and apparatus for transceiving wireless charging related information, a method and apparatus for receiving wireless charging related information, a communication device, and a computer readable storage medium.

BACKGROUND

With the development of cellular mobile communication technologies, especially with advances in millimeter wave communication technology, more and more antennas may be configured on a base station. This may be done, for example, to implement 5G massive MIMO (large-scale multiple input output) technology which uses a large number of antennas. In addition, based on the large number of antennas, some base stations may also provide wireless charging services for terminals.

SUMMARY

Accordingly, a method and apparatus for sending wireless charging related information, a method and apparatus for transceiving wireless charging related information, a method and apparatus for receiving wireless charging related information, a communication device, and a computer readable storage medium are provided in embodiments of the present disclosure, to solve technical problems in the related art.

According to a first aspect of embodiments of the present disclosure, a method for sending wireless charging related information is provided, which is applicable to a first base station. The method includes: sending the wireless charging related information of a terminal to a core network.

According to a second aspect of embodiments of the present disclosure, a method for transceiving wireless charging related information is provided, which is applicable to a core network. The method includes: receiving the wireless charging related information of a terminal and information of a second base station to which the terminal needs to be handed over sent by a first base station; and sending the wireless charging related information to the second base station.

According to a third aspect of embodiments of the present disclosure, a method for receiving wireless charging related information is provided, which is applicable to a second base station. The method includes: receiving the wireless charging related information of a terminal sent by a core network.

According to a fourth aspect of embodiments of the present disclosure, a communication device is provided, and includes: a processor, a memory configured to store a computer program; in which, the computer program implements the above method for sending wireless charging related information and/or the method for receiving wireless charging related information when executed by the processor.

According to a fifth aspect of embodiments of the present disclosure, a communication device is provided, and includes: a processor, a memory configured to store a computer program; in which, the computer program implements the above method for transceiving wireless charging related information

BRIEF DESCRIPTION OF THE DRAWINGS

In order to explain the technical solutions in embodiments of the present disclosure more clearly, the drawings described in the embodiments will be briefly introduced below. Obviously, the diagrams described as below are only some embodiments of the present disclosure. Those skilled in the art may obtain other drawings according to these drawings on the premise of not involving any inventive effort.

FIG. 1 is a flow chart illustrating a method for sending wireless charging related information according to an embodiment of the present disclosure.

FIG. 2 is a flow chart illustrating a method for sending wireless charging related information according to another embodiment of the present disclosure.

FIG. 3 is a flow chart illustrating a method for sending wireless charging related information according to another embodiment of the present disclosure.

DETAILED DESCRIPTION

Figure 4:
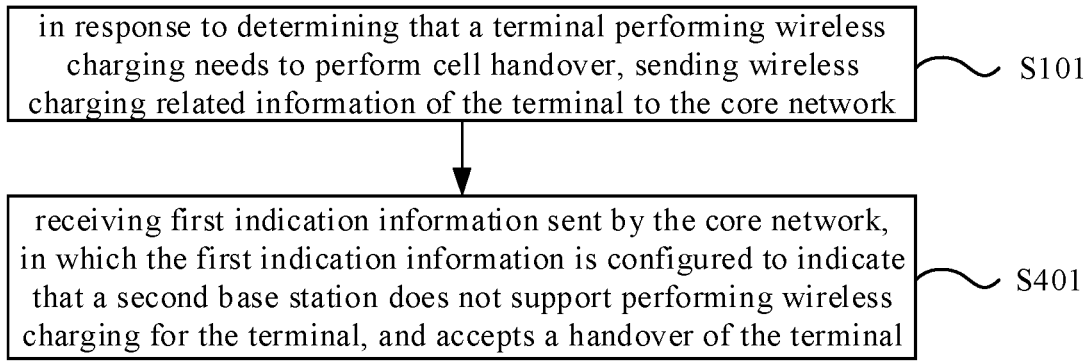
FIG. 4 is a flow chart illustrating a method for sending wireless charging related information according to another embodiment of the present disclosure.

The technical solutions in the embodiments of the disclosure will be clearly and completely described below in combination with the accompanying drawings in the embodiments of the disclosure. Obviously, the embodiments described here are only part of the embodiments of the disclosure and are not all embodiments of the disclosure. Based on the embodiments of the disclosure, other embodiments obtained by those skilled in the art without inventive work are within the protection scope of the disclosure.

The terms used in the embodiments of the disclosure are only for the purpose of describing specific embodiments, and are not intended to limit the disclosure. The singular forms "a", "the" and "said" used in the embodiments of the present disclosure and appended claims are also intended to include plural forms, unless the context clearly indicates other meanings. It should also be understood that the term "and/or" as used herein refers to and includes any or all possible combinations of one or more associated listed items.

It should be understood that although the terms "first", "second", and "third" may be used in the embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

For purpose of simplicity and ease of understanding, the terms "greater than", "less than", "higher than" and "lower than" are used in the disclosure, to represent size relations. However, it can be understood by those skilled in the art that the term "greater than" also covers the meaning of "greater than or equal to", and "less than" also covers the meaning of "less than or equal to". The term "higher than" covers the meaning of "higher than or equal to", and the term "less than" also covers the meaning of "less than or equal to".

FIG. 1 is a flow chart illustrating a method for sending wireless charging related information according to an embodiment of the present disclosure. The method for sending wireless charging related information in the embodiment may be applicable to a first base station, and the first base station may communicate with a terminal or may communicate with a core network.

The terminal includes, but is not limited to, communication apparatuses such as a cell phone, a tablet computer, a wearable device, a sensor, an Internet of Things (IoT) device, and the like. The first base station includes, but is not limited to, a base station in a communication system, such as a 4G base station, a 5G base station, a 6G base station, and the like.

In an embodiment, the first base station may be a base station corresponding to a cell where the terminal is currently located. Moreover, the first base station may be performing wireless charging for the terminal.

It should be noted that, in all embodiments of the present disclosure, the wireless charging refers to that the base station charges the terminal wirelessly. The manner of performing the wireless charging includes at least one of the followings:

an electromagnetic induction manner, an electromagnetic resonance manner, or a wireless radio frequency manner.

In an embodiment, the base station charges the terminal in the wireless radio frequency manner, which specifically refers to the air charging.

The air charging refers to that the base station may transmit energy to the terminal in the form of millimeter waves and narrow bandwidth through a plurality of antennas. The terminal may receive the energy through a miniature beacon antenna, and convert the energy into electrical energy to realize charging. The base station having an air charging capability may further refer to that the base station may determine a position of the terminal, and transmit the energy to the terminal at the position for charging.

As illustrated in FIG. 1, the method for sending wireless charging related information includes following block S101.

At block S101, the wireless charging related information of a terminal is sent to a core network.

In an embodiment, the first base station may determine the wireless charging related information of the terminal. For example, the terminal currently accesses the first base station, and may send its own wireless charging capability information to the first base station. The first base station may determine the wireless charging related information of the terminal based on the wireless charging capability information of the terminal, a wireless charging configuration configured for the terminal by the first base station, and the like.

In an embodiment, the wireless charging related information includes at least one of the followings: the wireless charging capability information of the terminal, the wireless charging configuration configured for the terminal by the first base station, the wireless charging configuration configured for the terminal recommended by the first base station, a wireless charging requirement of the terminal, or a wireless charging state of the terminal.

The first base station sends the wireless charging related information of the terminal to the core network, so that the core network sends the wireless charging related information to a second base station as needed, for example, the second base station may be a base station capable of providing a wireless charging service for the terminal, or may be a base station to which the terminal is handed over. It is beneficial to ensuring that the second base station may provide a suitable wireless charging configuration for the terminal after the terminal is handed over to the second base station, so that the terminal continues to perform wireless charging via the second base station.

In an embodiment, the first base station may send the wireless charging related information of the terminal to the core network, when determining that the terminal performing the wireless charging needs to perform cell handover.

The first base station may wirelessly charge the terminal, and when the first base station determines that the terminal needs to perform cell handover, for example, when receiving a measure report sent by the terminal, the wireless charging related information of the terminal may be sent to the core network (for example, an access and mobility management function (AMF)).

In an embodiment, the core network may send the wireless charging related information to the second base station to which the terminal needs to be handed over, that is, the base station corresponding to the cell to which the terminal needs to be handed over, so that the second base station may configure the wireless charging configuration for the terminal, for example, configure the wireless charging configuration for the terminal based on the wireless charging related information.

For example, the second base station may configure the wireless charging configuration that satisfies the wireless charging capability of the terminal for the terminal based on the wireless charging capability information of the terminal. For example, the wireless charging capability information of the terminal includes a wireless charging frequency and a wireless charging power, and the second base station may configure the wireless charging configuration with a corresponding frequency and a corresponding power for the terminal.

For example, the second base station may configure the wireless charging configuration which is the same as the wireless charging configuration configured for the terminal by the first base station for the terminal based on the wireless charging configuration configured for the terminal by the first base station, so that the terminal can perform wireless charging based on the same wireless charging configuration without any adjustment, which is beneficial to saving resources of the terminal.

For example, the second base station may configure the wireless charging configuration which is the same as the wireless charging configuration configured for the terminal recommended by the first base station for the terminal based on the wireless charging configuration configured for the terminal recommended by the first base station. Since the wireless charging configuration configured for the terminal recommended by the first base station may meet requirements of the terminal better, it can be ensured that the wireless charging configuration configured by the second base station also meets the requirements of the terminal.

For example, the second base station may configure the wireless charging configuration meeting the wireless charging requirement of the terminal for the terminal based on the wireless charging requirement of the terminal. For example, the wireless charging capability information of the terminal includes the wireless charging frequency and the wireless charging power, and the second base station may configure the wireless charging configuration with a corresponding frequency and a corresponding power for the terminal.

It should be noted that the wireless charging requirement of the terminal and the wireless charging capability of the terminal may include the same information, but have meanings not completely the same. The wireless charging capability of the terminal is an inherent capability of the terminal, which generally does not change, while the wireless charging requirement of the terminal is a requirement that may be proposed by the terminal within its wireless charging capability range as needed, which is variable within the wireless charging capability range.

For example, the second base station may configure the wireless charging configuration that meets the wireless charging state of the terminal for the terminal based on the wireless charging state of the terminal. For example, the wireless charging state of the terminal includes a charging duration during which the terminal still needs to be charged and the like, and then the second base station may configure the wireless charging configuration with a corresponding charging duration for the terminal.

Accordingly, it is beneficial to ensuring that after the terminal is handed over to the second base station, the second base station may provide a suitable wireless charging configuration for the terminal, so that the terminal may continue to perform wireless charging via the second base station.

In an embodiment, sending the wireless charging related information of the terminal to the core network includes: sending the wireless charging related information of the terminal to the core network via an interface between the base station and the core network. That is, the first base station may send the wireless charging related information of the terminal to the core network via the interface between the base station and the core network. The interface includes, but is not limited to, an S1 or NG interface.

It should be noted that, in all embodiments of the present disclosure, communications (reception, transmission) between the core network and the base station (the first base station, the second base station) may be implemented via the interface between the base station and the core network.

In an embodiment, the method further includes: determining the second base station to which the terminal needs to be handed over; and sending the information of the second base station to the core network.

The first base station may determine the second base station to which the terminal needs to be handed over. For example, an identifier of the second base station may be included in the measure report reported by the terminal to the first base station. The first base station may determine the second base station accordingly. For example, the second base station may be a neighboring base station of the first base station by default, so that the first base station may directly determine the second base station.

The information of the second base station (for example, the identifier) is sent to the core network, so that the core network may determine the second base station, and send the wireless charging related information to the second base station.

FIG. 2 is a flow chart illustrating a method for sending wireless charging related information according to another embodiment of the present disclosure. As illustrated in FIG. 2, the method further includes blocks S201 to S202.

At block S201, a measure report sent by the terminal is received, the measure report includes signal quality information of at least one candidate base station; and/or wireless charging capability information of the at least one candidate base station is obtained.

Determining the second base station to which the terminal needs to be handed over includes the followings.

At step S202, the second base station is determined in the at least one candidate base station based on the signal quality information of the at least one candidate base station and/or the wireless charging capability information of the at least one candidate base station.

In an embodiment, the terminal may perform measurement on a candidate base station to which the terminal may be handed over. For example, a neighboring base station of the first base station is measured, the measure report containing the signal quality information of the candidate base station is obtained and sent to the first base station.

In an embodiment, the first base station may further obtain the wireless charging capability information of the candidate base station, for example, the first base station may obtain the wireless charging capability information of the candidate base station from the terminal or the core network.

For example, the candidate base station may send its own wireless charging capability information to the core network, so that the first base station may obtain the wireless charging capability information of the candidate base station from the core network. For example, the candidate base station may broadcast its own wireless charging capability information, so that the terminal may receive the wireless charging capability information of the candidate base station, and report the wireless charging capability information of the candidate base station to the first base station.

In an embodiment, the first base station may determine the second base station in the at least one candidate base station based on the signal quality information of the at least one candidate base station. For example, a candidate base station with a best signal quality is determined as the second base station.

In an embodiment, the first base station may determine the second base station in the at least one candidate base station based on the wireless charging capability information of the at least one candidate base station. For example, the first base station may determine the candidate base station with the wireless charging capability information most matching the wireless charging related information of the terminal as the second base station.

In an embodiment, the first base station may comprehensively consider the signal quality information of the at least one candidate base station and the wireless charging capability information of the at least one candidate base station.

For example, a weighted summation may be performed on the signal quality information of the candidate base station and the wireless charging capability information of the candidate base station, and a candidate base station with a maximum summation result is determined as the second base station.

For example, one or more matched base stations with the wireless charging capability information matching the wireless charging capability information of the terminal may be determined in the at least one candidate base station. The second base station is determined in the one or more matched base stations based on the signal quality information of the one or more matched base stations.

The wireless charging capability information of the candidate base station matching the wireless charging capability information of the terminal means that a difference between a wireless charging capability of the candidate base station and a wireless charging capability of the terminal is within a preset range. For example, the wireless charging capability information of the terminal includes a wireless charging frequency and a wireless charging power. In the at least one candidate base station, the candidate base station with the wireless charging frequency between which and the wireless charging frequency of the terminal a difference is within a preset frequency range, and the wireless charging power between which and the wireless charging power of the terminal a difference is within a preset power range is determined as a matched base station.

In an embodiment, the wireless charging related information is carried in a handover required signaling. That is, the first base station may carry the wireless charging related information in the handover required signaling and send the handover required signaling to the core network, so that it is unnecessary to send the wireless charging related information separately, which is beneficial to saving communication resources.

In an embodiment, the wireless charging related information is carried in a newly added information element (IE) of the handover required signaling; or the wireless charging related information is carried in a source to target transparent container IE.

A new IE may be added in the handover request signaling, and the wireless charging related information is carried in the newly added IE which is sent to the core network. The wireless charging related information may also be carried in the source to target transparent container IE in the handover request signaling which sent to the core network.

The source to target transparent container IE includes, but is not limited to, NG-RAN node to target NG-RAN node transparent container IE, source eNB to target eNB transparent container IE, source RNC to target RNC transparent container IE.

FIG. 3 is a flow chart illustrating a method for sending wireless charging related information according to another embodiment of the present disclosure. As illustrated in FIG. 3, the method further includes blocks S301 to S302.

At block S301, a wireless charging configuration configured for the terminal by the second base station and sent by the core network is received.

At block S302, the wireless charging configuration configured for the terminal by the second base station is sent to the terminal.

In an embodiment, after the second base station receives the wireless charging related information of the terminal from the core network, if the second base station accepts a handover of the terminal, and the second base station supports performing wireless charging for the terminal, the wireless charging configuration may be configured for the terminal. The wireless charging configuration can be sent to the core network, the core network sends the wireless charging configuration to a first base station, and the first base station sends the wireless charging configuration to the terminal. Accordingly, the terminal may determine the wireless charging configuration configured for the terminal by the second base station before the handover to the second base station, so that after the terminal is handed over to the second base station, the wireless charging configuration can be directly used for receiving a wireless charging signal of the second base station.

The second base station may configure the wireless charging configuration for the terminal based on the wireless charging related information of the terminal, a specific configuration mode is described in the foregoing embodiments, and details are not described again subsequently.

FIG. 4 is a flow chart illustrating a method for sending wireless charging related information according to another embodiment of the present disclosure. As illustrated in FIG. 4, the method further includes block S401.

At block S401, first indication information sent by the core network is received, the first indication information is configured to indicate that the second base station does not support performing wireless charging for the terminal, and accepts a handover of the terminal.

In an embodiment, after the second base station receives the wireless charging related information of the terminal from the core network, if the second base station accepts the handover of the terminal, the second base station does not support performing wireless charging for the terminal, the first indication information may be sent to the core network.

The first indication information indicates that the second base station does not support performing wireless charging for the terminal and accepts the handover of the terminal. The core network may further send the first indication information to the first base station, so that the first base station knows that the second base station does not support performing wireless charging for the terminal and accepts the handover of the terminal, and the first base station redetermines a base station to which the terminal can be handed over, or instructs the terminal to remeasure the at least one candidate base station.

Figure 5A:
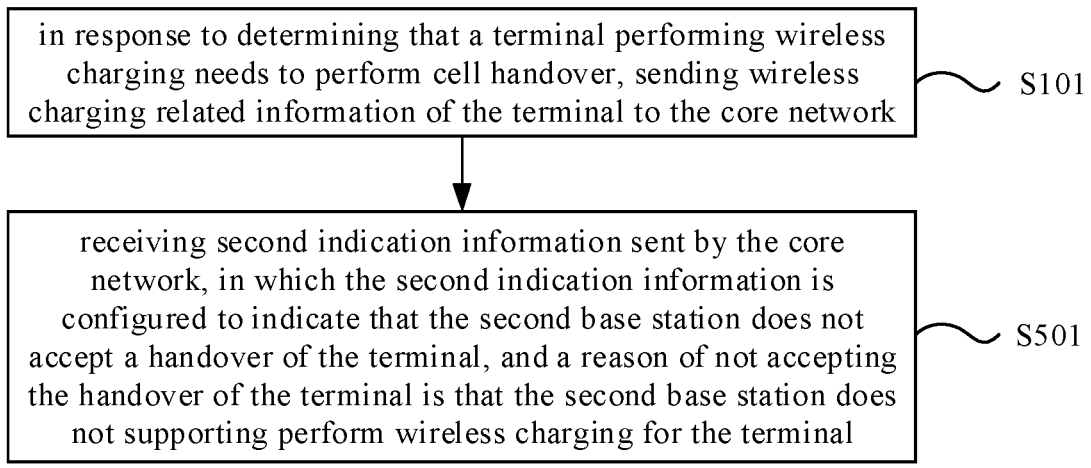
FIG. 5A is a flow chart illustrating a method for sending wireless charging related information according to another embodiment of the present disclosure.

FIG. 5A is a flow chart illustrating a method for sending wireless charging related information according to another embodiment of the present disclosure. As illustrated in FIG. 5A, the method further includes block S501.

At block S501, second indication information sent by the core network is received, the second indication information is configured to indicate that the second base station does not accept a handover of the terminal, and a reason of not accepting the handover of the terminal is that the second base station does not support performing wireless charging for the terminal.

In an embodiment, after the second base station receives the wireless charging related information of the terminal from the core network, if the second base station does not accept the handover of the terminal due to that the second base station does not support performing the wireless charging for the terminal, the second indication information may be sent to the core network. The second indication information indicates that the second base station does not accept the handover of the terminal, and the reason of not accepting the handover of the terminal is that the second base station does not support performing wireless charging for the terminal. The core network may further send the second indication information to the first base station, so that the first base station knows that the second base station does not accept the handover of the terminal and the reason of not accepting the handover of the terminal is that the second base station does not support performing wireless charging for the terminal, and the first base station redetermines a base station to which the terminal can be handed over, or instructs the terminal to remeasure the at least one candidate base station.

Figure 5B:
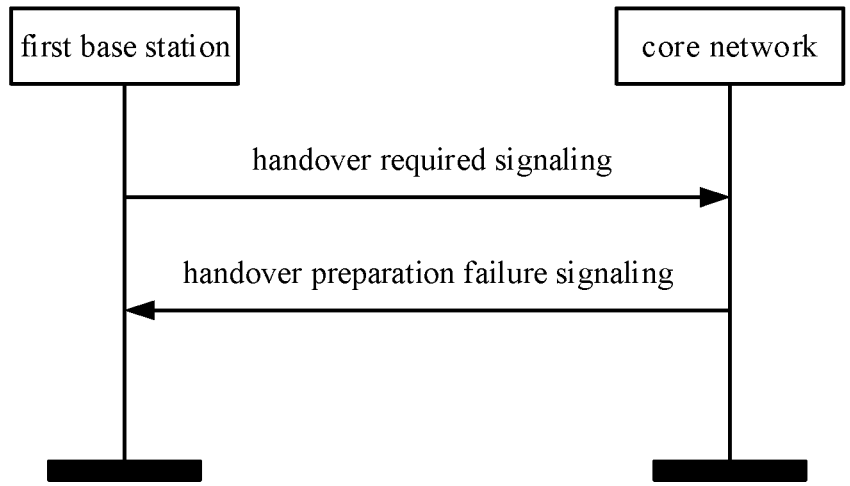
FIG. 5B is a schematic diagram illustrating an interaction between a first base station and a core network according to an embodiment of the present disclosure.
Figure 5C:
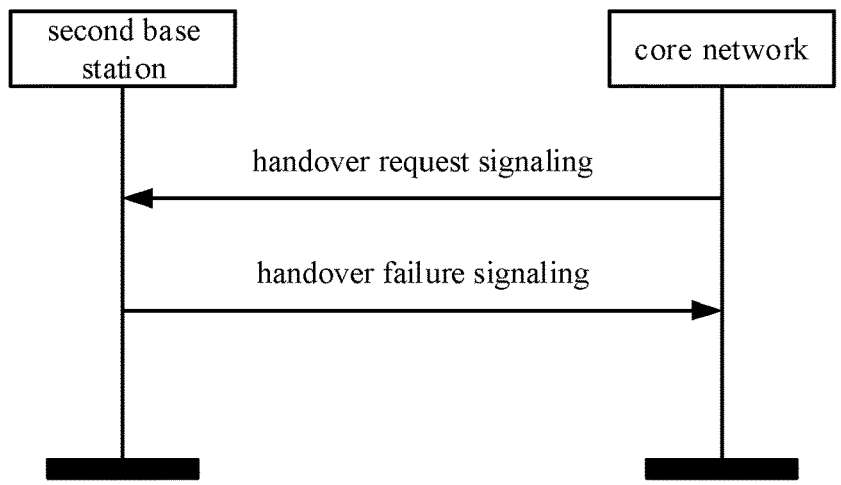
FIG. 5C is a schematic diagram illustrating an interaction between a second base station and a core network according to an embodiment of the present disclosure.

FIG. 5B is a schematic diagram illustrating an interaction between the first base station and the core network according to an embodiment of the present disclosure. FIG. 5C is a schematic diagram illustrating an interaction between the second base station and the core network according to an embodiment of the present disclosure.

As shown in FIG. 5B and FIG. 5C, the first base station may carry the wireless charging related information of the terminal in the handover required signaling and send the handover required signaling to the core network. The handover required signaling may further carry information of the second base station to which the terminal needs to be handed over.

After receiving the wireless charging related information, the core network may carry the wireless charging related information in the handover request signaling and send the handover request signaling to the second base station.

If the second base station does not accept the handover of the terminal, for example, the reason of not accepting the handover of the terminal may be that the second base station does not support wireless charging or other reasons (for example, a load is too high), indication information (such as the second indication information in the foregoing embodiment) may be sent to the core network, to indicate to the core network that the second base station does not accept the handover of the terminal and the reason of not accepting the handover of the terminal. For example, the indication information may be carried in a handover failure signaling and sent to the core network.

After receiving the indication information sent by the second base station, the core network may determine that the second base station does not accept the handover of the terminal, and then carry the indication information in a handover preparation failure signaling to send the indication information to the first base station. Based on the indication information, the first base station may determine that the second base station does not accept the handover of the terminal and the reason of not accepting the handover of the terminal, for example, the second base station does not support wireless charging. The first base station may redetermine the second base station, or instruct the terminal to perform measurement on a neighboring base station again and report a measure report.

Figure 6:
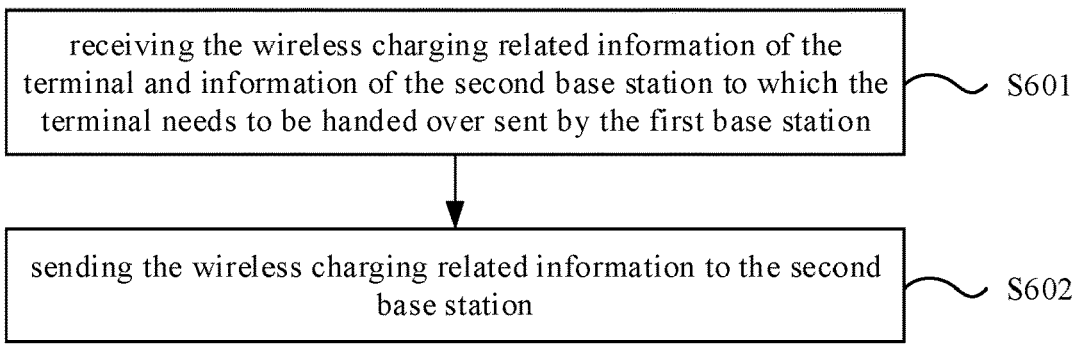
FIG. 6 is a flow chart illustrating a method for transceiving wireless charging related information according to an embodiment of the present disclosure.

FIG. 6 is a flow chart illustrating a method for transceiving wireless charging related information according to an embodiment of the present disclosure. The method for transceiving wireless charging related information in the embodiment may be applicable to a core network, and the core network may communicate with a first base station and a second base station. The first base station and the second base station may communicate with a terminal.

The terminal includes, but is not limited to, communication devices such as a mobile phone, a tablet computer, a wearable device, a sensor, an Internet of Things device, and the like. The first and second base stations include, but are not limited to, base stations in a communication system such as 4G base stations, 5G base stations, 6G base stations, and the like.

In an embodiment, the first base station may be a base station corresponding to a cell where the terminal is currently located. Moreover, the first base station may be performing wireless charging for the terminal.

As illustrated in FIG. 6, the method for transceiving wireless charging related information includes following blocks 601 and 602.

At block 601, the wireless charging related information of the terminal and information of the second base station to which the terminal needs to be handed over sent by the first base station are received.

At block 602, the wireless charging related information is sent to the second base station.

In an embodiment, the first base station may wirelessly charge the terminal, and when the first base station determines that the terminal needs to perform cell handover, for example, when receiving a measure report sent by the terminal, the wireless charging related information of the terminal may be sent to the core network.

In an embodiment, the wireless charging related information includes at least one of the followings: wireless charging capability information of the terminal, a wireless charging configuration configured for the terminal by the first base station, a wireless charging configuration configured for the terminal recommended by the first base station, a wireless charging requirement of the terminal, or a wireless charging state of the terminal.

In an embodiment, the core network may send the wireless charging related information to the second base station to which the terminal needs to be handed over, that is, the base station corresponding to the cell to which the terminal needs to be handed over, so that the second base station may configure the wireless charging configuration for the terminal, for example, configure the wireless charging configuration for the terminal based on the wireless charging related information.

Accordingly, it is beneficial to ensuring that after the terminal is handed over to the second base station, the second base station may provide a suitable wireless charging configuration for the terminal, so that the terminal may continue to perform wireless charging via the second base station.

In an embodiment, sending the wireless charging related information of the terminal to the second base station includes: carrying the wireless charging related information in a handover request signaling to send the wireless charging related information to the second base station. Accordingly, there is no need to separately send the wireless charging related information, which is beneficial to saving communication resources.

In an embodiment, carrying the wireless charging related information in the handover request signaling to send the wireless charging related information to the second base station includes: in case that the wireless charging related information sent by the first base station is carried in the handover required signaling, carrying the wireless charging related information in the handover request signaling to send the wireless charging related information to the second base station.

In an embodiment, sending the wireless charging related information to the second base station includes: in case that the wireless charging related information sent by the first base station is carried in a source to target transparent container IE, transparently transmitting the source to target transparent container IE to the second base station.

Figure 7:
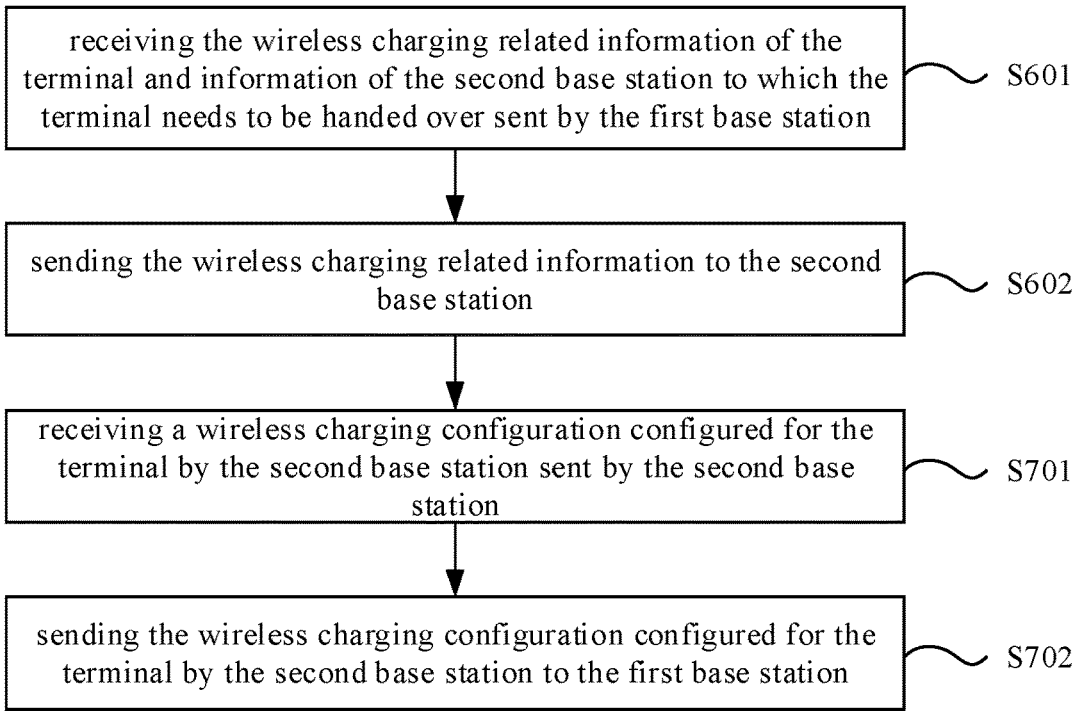
FIG. 7 is a flow chart illustrating a method for transceiving wireless charging related information according to another embodiment of the present disclosure.

FIG. 7 is a flow chart illustrating a method for transceiving wireless charging related information according to another embodiment of the present disclosure. As illustrated in FIG. 7, the method further includes blocks S701 to S702.

At block S701, a wireless charging configuration configured for the terminal by the second base station and sent by the second base station is received.

At block S702, the wireless charging configuration configured for the terminal by the second base station is sent to the first base station.

In an embodiment, after the second base station receives the wireless charging related information of the terminal from the core network, if the second base station accepts a handover of the terminal, and the second base station supports performing wireless charging for the terminal, the wireless charging configuration may be configured for the terminal. The wireless charging configuration may be sent to the core network, the core network sends the wireless charging configuration to the first base station, and the first base station sends the wireless charging configuration to the terminal. Accordingly, the terminal may determine the wireless charging configuration configured for the terminal by the second base station before the handover to the second base station, so that after the terminal is handed over to the second base station, the wireless charging configuration can be directly used for receiving a wireless charging signal of the second base station.

Figure 8:
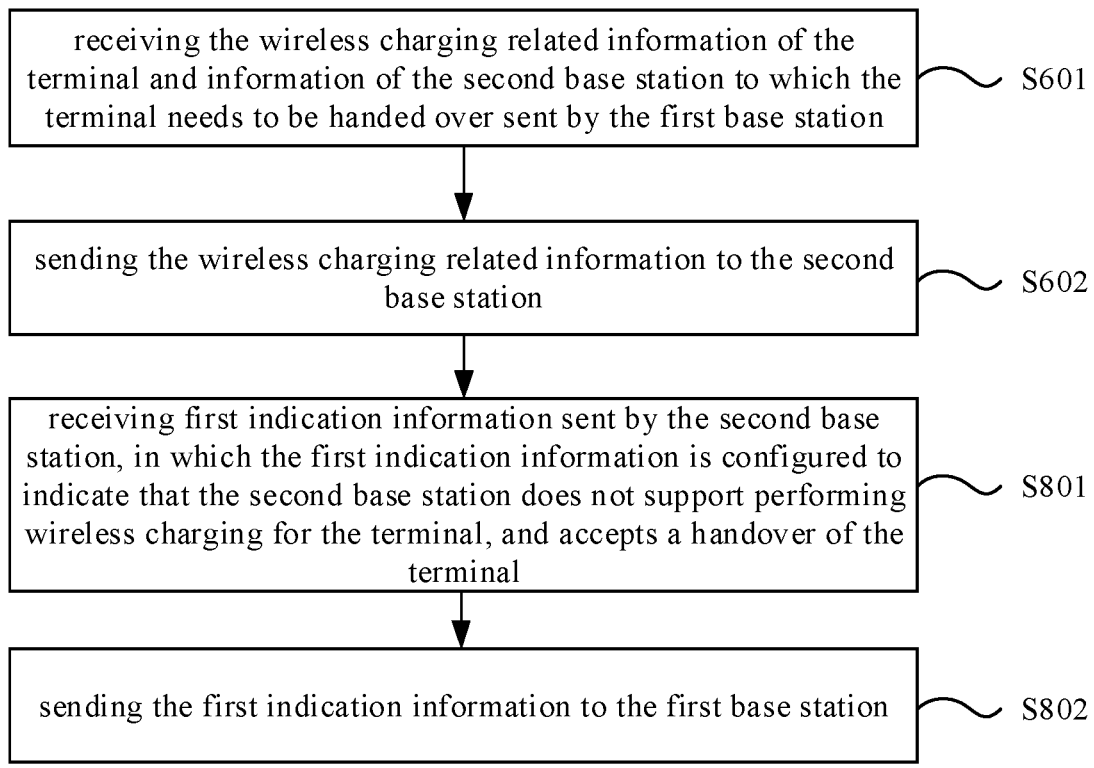
FIG. 8 is a flow chart illustrating a method for transceiving wireless charging related information according to another embodiment of the present disclosure.

FIG. 8 is a flow chart illustrating a method for transceiving wireless charging related information according to another embodiment of the present disclosure. As illustrated in FIG. 8, the method further includes blocks S801 to S802.

At block S801, first indication information sent by the second base station is received, the first indication information is configured to indicate that the second base station does not support performing wireless charging for the terminal, and accepts a handover of the terminal.

At block S802, the first indication information is sent to the first base station.

In an embodiment, after the second base station receives the wireless charging related information of the terminal from the core network, if the second base station accepts the handover of the terminal, and the second base station does not support performing wireless charging for the terminal, the first indication information may be sent to the core network. The first indication information indicates that the second base station does not support performing wireless charging for the terminal and accepts the handover of the terminal. The core network may further send the first indication information to the first base station, so that the first base station knows that the second base station does not support performing wireless charging for the terminal and accepts the handover of the terminal, and the first base station redetermines a base station to which the terminal can be handed over, or instructs the terminal to remeasure the at least one candidate base station.

Figure 9:
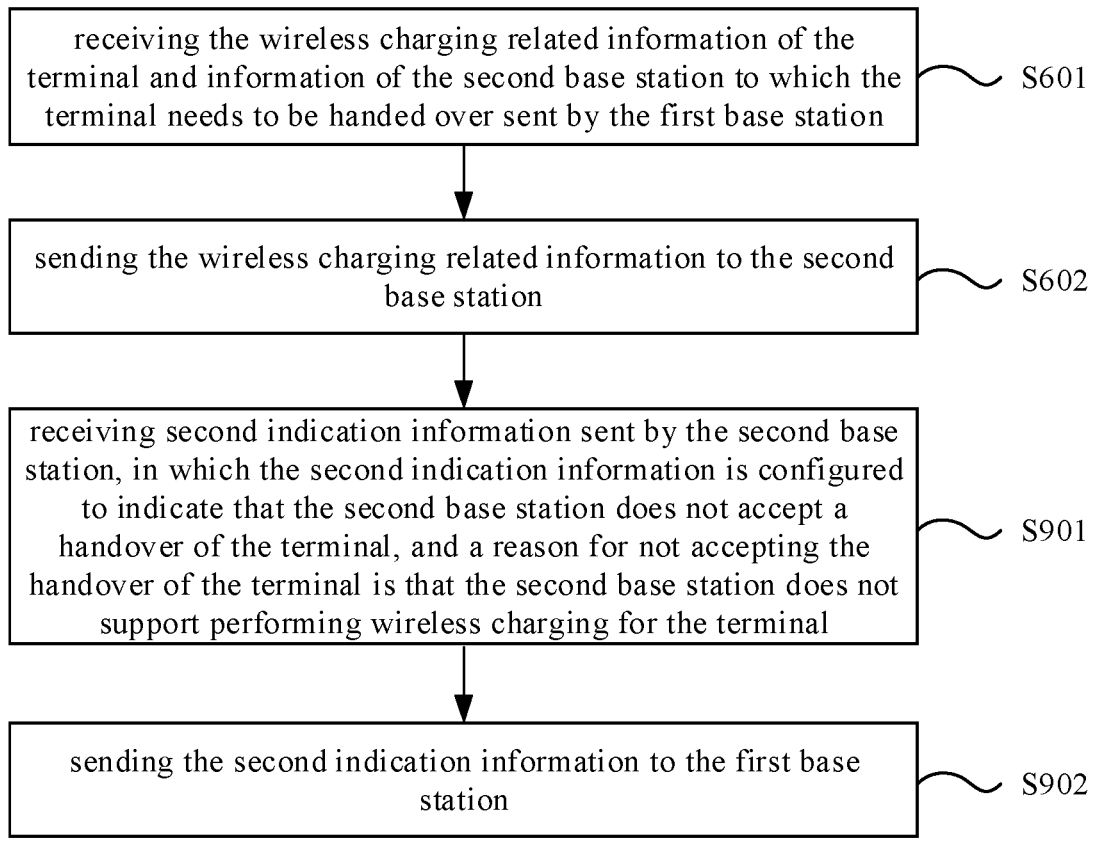
FIG. 9 is a flow chart illustrating a method for transceiving wireless charging related information according to another embodiment of the present disclosure.

FIG. 9 is a flow chart illustrating a method for transceiving wireless charging related information according to another embodiment of the present disclosure. As illustrated in FIG. 9, the method further includes blocks S901 to S902.

At block S901, second indication information sent by the second base station is received, the second indication information is configured to indicate that the second base station does not accept a handover of the terminal and a reason of not accepting the handover of the terminal is that the second base station does not support performing wireless charging for the terminal.

At block S902, the second indication information is sent to the first base station. In an embodiment, after the second base station receives the wireless charging related information of the terminal from the core network, if the second base station does not accept the handover of the terminal due to that the second base station does not support performing wireless charging for the terminal, the second indication information may be sent to the core network. The second indication information indicates that the second base station does not accept the handover of the terminal, and the reason of not accepting the handover of the terminal is that the wireless charging is not supported for the terminal. The core network may further send the second indication information to the first base station, so that first base station knows that the second base station does not accept the handover of the terminal and the reason of not accepting the handover of the terminal is that the wireless charging is not supported for the terminal, and the first base station redetermines a base station to which the terminal can be handed over, or instructs the terminal to perform measurement again on the at least one candidate base station.

In an embodiment, sending the second indication information to the first base station includes: carrying the second indication information in a handover preparation failure signaling to send the second indication information to the first base station. Accordingly, there is no need to separately send the second indication information, which is beneficial to saving communication resources.

Figure 10:
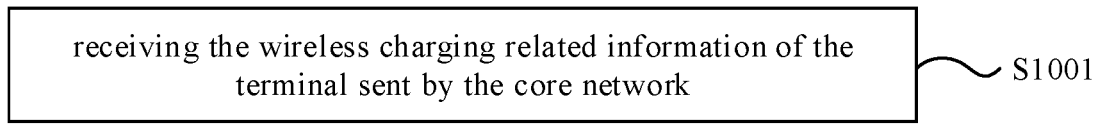
FIG. 10 is a flow chart illustrating a method for receiving wireless charging related information according to an embodiment of the present disclosure.

FIG. 10 is a flow diagram illustrating a method for receiving wireless charging related information according to an embodiment of the present disclosure. The method for receiving wireless charging related information in the embodiment may be applicable to a second base station, and the second base station may communicate with a core network and a terminal.

The terminal includes, but is not limited to, communication devices such as a mobile phone, a tablet computer, a wearable device, a sensor, an Internet of Things device, and the like. The second base station includes, but is not limited to, a base station in a communication system such as a 4G base station, a 5G base station, a 6G base station, and the like.

It should be noted that each the first base station and the second base station may not only implement the method for sending wireless charging related information, but may also implement the method for receiving wireless charging related information, which are specifically depends on the roles of the first base station and the second base station.

For example, the first base station is a base station corresponding to a cell where the terminal is currently located, and the second base station is a base station corresponding to a cell to which the terminal is to be handed over. The first base station implements the method for sending wireless charging related information, and the second base station implements the method for receiving wireless charging related information.

On the contrary, if the second base station is the base station corresponding to the cell where the terminal is currently located, the first base station is the base station corresponding to the cell to which the terminal is to be handed over. The second base station implements the method for sending wireless charging related information, and the first base station implements the method for receiving wireless charging related information.

As illustrated in FIG. 10, the method for receiving wireless charging related information includes following blocks S1001 and S1002.

At block S1001, the wireless charging related information of the terminal sent by the core network is received.

In an embodiment, the first base station may perform wireless charging for the terminal, and when the first base station determines that the terminal needs to perform cell handover, for example, when a measure report sent by the terminal is received, the wireless charging related information of the terminal may be sent to the core network.

In an embodiment, the wireless charging related information includes at least one of the followings: wireless charging capability information of the terminal, a wireless charging configuration configured for the terminal by the first base station, a wireless charging configuration configured for the terminal recommended by the first base station, a wireless charging requirement of the terminal, or a wireless charging state of the terminal.

In an embodiment, the core network may send the wireless charging related information to the second base station to which the terminal needs to be handed over, that is, the base station corresponding to the cell to which the terminal needs to be handed over, so that the second base station may configure the wireless charging configuration for the terminal, for example, configure the wireless charging configuration for the terminal based on the wireless charging related information.

Accordingly, it is beneficial to ensuring that after the terminal is handed over to the second base station, the second base station may provide a suitable wireless charging configuration for the terminal, so that the terminal may continue to perform wireless charging via the second base station.

Figure 11:
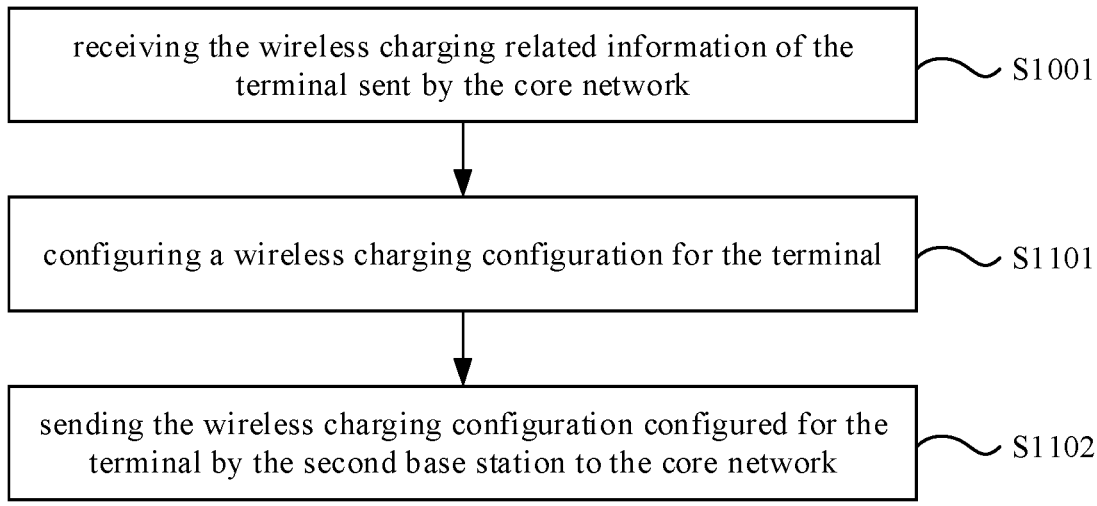
FIG. 11 is a flow chart illustrating a method for receiving wireless charging related information according to another embodiment of the present disclosure.

FIG. 11 is a flow chart illustrating a method for receiving wireless charging related information according to another embodiment of the present disclosure. As illustrated in FIG. 11, the method further includes blocks S1101 to S1102.

At block S1101, a wireless charging configuration is configured for the terminal.

At block S1102, the wireless charging configuration configured for the terminal by the second base station is sent to the core network.

In an embodiment, after the second base station receives the wireless charging related information of the terminal from the core network, if the second base station accepts a handover of the terminal, and the second base station supports performing wireless charging for the terminal, the wireless charging configuration may be configured for the terminal. The wireless charging configuration may be sent to the core network, the core network sends the wireless charging configuration to the first base station, and the first base station sends the wireless charging configuration to the terminal. Accordingly, the terminal may determine the wireless charging configuration configured for the terminal by the second base station before the handover to the second base station, so that after the terminal is handed over to the second base station, the wireless charging configuration can be directly used for receiving a wireless charging signal of the second base station.

In an embodiment, the wireless charging configuration configured for the terminal by the second base station is carried in a handover request acknowledge signaling. Accordingly, there is no need to separately send the wireless charging configuration, which is beneficial to saving communication resources.

In an embodiment, the wireless charging configuration configured for the terminal by the second base station is carried in a target to source transparent container IE in a handover request acknowledge signaling. In this case, the core network may transparently transmit the target to source transparent container IE carrying the wireless charging configuration to the first base station.

Figure 12:
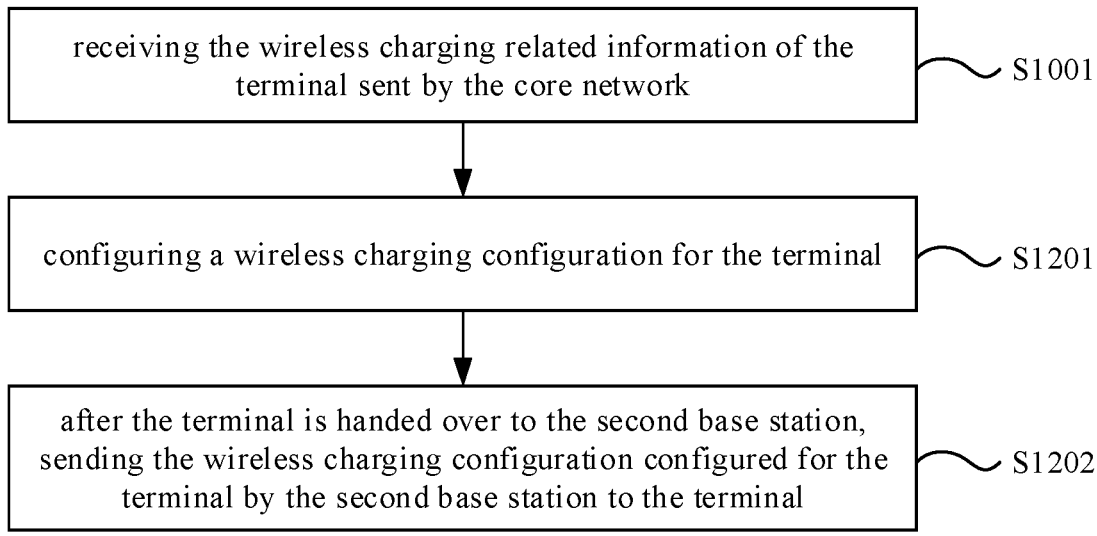
FIG. 12 is a flow chart illustrating a method for receiving wireless charging related information according to another embodiment of the present disclosure.

FIG. 12 is a flow chart illustrating a method for receiving wireless charging related information according to another embodiment of the present disclosure. As illustrated in FIG. 12, the method further includes blocks S1201 to S1202.

At block S1201, a wireless charging configuration is configured for the terminal.

At block S1202, after the terminal is handed over to the second base station, the wireless charging configuration configured for the terminal by the second base station is sent to the terminal.

In an embodiment, after the second base station receives the wireless charging related information of the terminal from the core network, if the second base station accepts a handover of the terminal, and the second base station supports performing wireless charging for the terminal, the wireless charging configuration may be configured for the terminal. After the terminal is handed over to the second base station, the wireless charging configuration configured for the terminal by the second base station is directly sent to the terminal, so that the terminal receives a wireless charging signal of the second base station by using the wireless charging configuration after the terminal is handed over to the second base station.

In an embodiment, the wireless charging configuration configured for the terminal by the second base station is carried in a radio resource control reconfiguration (RRCReconfiguration) signaling or a radio resource control connection reconfiguration (RRCConnectionReconfiguration) signaling.

Figure 13:
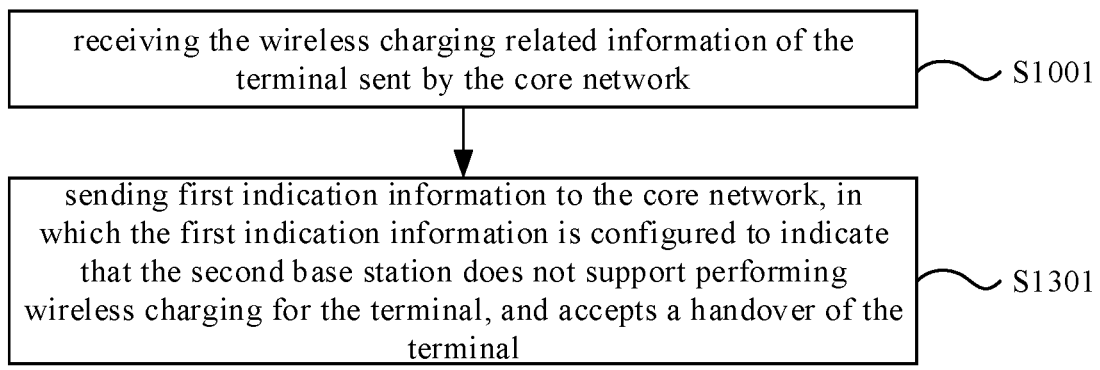
FIG. 13 is a flow chart illustrating a method for receiving wireless charging related information according to another embodiment of the present disclosure.

FIG. 13 is a flow chart illustrating a method for receiving wireless charging related information according to another embodiment of the present disclosure. As illustrated in FIG. 13, the method further includes block S1301.

At block S1301, first indication information is sent to the core network, the first indication information is configured to indicate that the second base station does not support performing wireless charging for the terminal, and accepts the handover of the terminal.

In an embodiment, after the second base station receives the wireless charging related information of the terminal from the core network, if the second base station accepts the handover of the terminal, and the second base station does not support performing wireless charging for the terminal, the first indication information may be sent to the core network. The first indication information indicates that the second base station does not support performing the wireless charging for the terminal and accepts the handover of the terminal. The core network may further send the first indication information to the first base station, so that the first base station knows that the second base station does not support performing wireless charging for the terminal and accepts the handover of the terminal, and the first base station redetermines a base station to which the terminal can be handed over, or instructs the terminal to perform measurement again on the at least one candidate base station.

Figure 14:
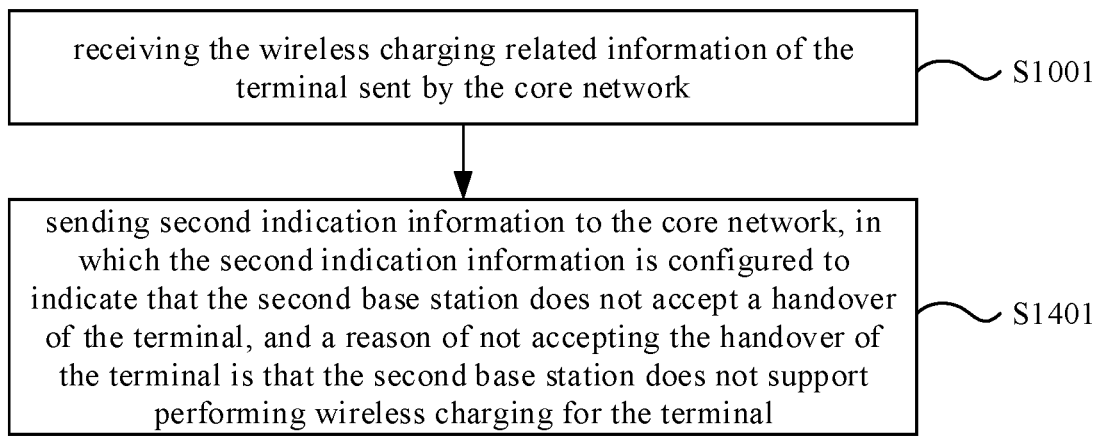
FIG. 14 is a flow chart illustrating a method for receiving wireless charging related information according to another embodiment of the present disclosure.

FIG. 14 is a flow chart illustrating a method for receiving wireless charging related information according to another embodiment of the present disclosure. As illustrated in FIG. 14, the method further includes block S1401.

At block S1401, second indication information is sent to the core network, the second indication information is configured to indicate that the second base station does not accept a handover of the terminal, and a reason of not accepting the handover of the terminal is that the second base station does not support performing wireless charging for the terminal.

In an embodiment, after the second base station receives the wireless charging related information of the terminal from the core network, if the second base station does not accept the handover of the terminal due to that the second base station does not support performing wireless charging for the terminal, the second indication information may be sent to the core network. The second indication information indicates that the second base station does not accept the handover of the terminal, and the reason of not accepting the handover of the terminal is that the wireless charging is not supported for the terminal. The core network may further send the second indication information to the first base station, so that first base station knows that the second base station does not accept the handover of the terminal and the reason of not accepting the handover of the terminal is that the wireless charging is not supported for the terminal, and the first base station redetermines a base station to which the terminal can be handed over, or instructs the terminal to perform measurement again on the at least one candidate base station.

For example, the second base station may carry the second indication information in a handover failure signaling to send the second indication information to the core network. Accordingly, there is no need to separately send the second indication information, which is beneficial to saving communication resources.

Corresponding to foregoing embodiments of the method for sending wireless charging related information, the method for transceiving wireless charging related information, and the method for receiving wireless charging related information, embodiments of an apparatus for sending wireless charging related information, an apparatus for transceiving wireless charging related information, and an apparatus for receiving wireless charging related information may further be provided in the present disclosure.

Figure 15:
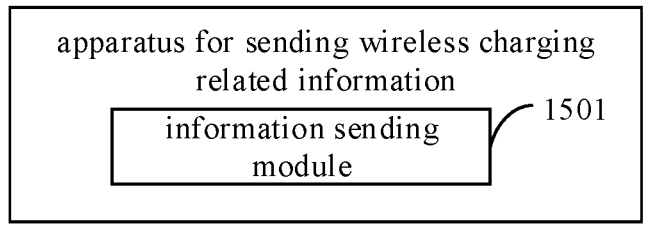
FIG. 15 is a block diagram illustrating an apparatus for sending wireless charging related information according to an embodiment of the present disclosure.

FIG. 15 is a block diagram illustrating an apparatus for sending wireless charging related information according to an embodiment of the present disclosure. The apparatus for sending wireless charging related information in the embodiment may be applicable to a first base station, and the first base station may communicate with a terminal or may communicate with a core network.

The terminal includes, but is not limited to, communication devices such as a mobile phone, a tablet computer, a wearable device, a sensor, an internet of things device, and the like. The first base station includes, but is not limited to, a base station in a communication system such as a 4G base station, a 5G base station, a 6G base station, and the like.

As illustrated in FIG. 15, the apparatus for sending wireless charging related information includes an information sending module 1501.

The information sending module 1501 is configured to send the wireless charging related information of the terminal to the core network.

In an embodiment, the information sending module is configured to send the wireless charging related information of the terminal to the core network, in response to determining that the terminal performing the wireless charging needs to perform cell handover.

In an embodiment, the apparatus further includes: a base station determining module, configured to determine a second base station to which the terminal needs to be handed over. The information sending module is further configured to send information of the second base station to the core network.

In an embodiment, the apparatus further includes: a report receiving module, configured to receive a measure report sent by the terminal, in which the measure report includes signal quality information of at least one candidate base station; and/or a capability obtaining module, configured to obtain wireless charging capability information of the at least one candidate base station. The base station determining module is configured to determine the second base station in the at least one candidate base station based on the signal quality information of the at least one candidate base station and/or the wireless charging capability information of the at least one candidate base station.

In an embodiment, the capability obtaining module is configured to obtain the wireless charging capability information of the at least one candidate base station from the terminal or the core network.

In an embodiment, the base station determining module is configured to determine one or more matched base stations with the wireless charging capability information matching wireless charging capability information of the terminal in the at least one candidate base station; and determine the second base station in the one or more matched base stations based on the signal quality information of the one or more matched base stations.

In an embodiment, the wireless charging related information is carried in a handover required signaling.

In an embodiment, the wireless charging related information is carried in a newly added IE of the handover required signaling; or the wireless charging related information is carried in a source to target transparent container IE.

In an embodiment, the apparatus further includes: a configuration receiving module, configured to receive a wireless charging configuration configured for the terminal by the second base station and sent by the core network; and a configuration sending module, configured to send the wireless charging configuration configured for the terminal by the second base station to the terminal.

In an embodiment, the apparatus further includes: a first indication receiving module, configured to receive first indication information sent by the core network. The first indication information is configured to indicate that a second base station does not support performing wireless charging for the terminal, and accepts a handover of the terminal.

In an embodiment, the apparatus further includes: a second indication receiving module, configured to receive second indication information sent by the core network. The second indication information is configured to indicate that the second base station does not accept a handover of the terminal, and a reason of not accepting the handover of the terminal is that the second base station does not support performing wireless charging for the terminal.

In an embodiment, the information sending module is configured to send the wireless charging related information of the terminal to the core network via an interface between a base station and the core network.

In an embodiment, the wireless charging related information includes at least one of the following: wireless charging capability information of the terminal, a wireless charging configuration configured for the terminal by the first base station, a wireless charging configuration configured for the terminal recommended by the first base station, a wireless charging requirement of the terminal, or a wireless charging state of the terminal.

Figure 16:
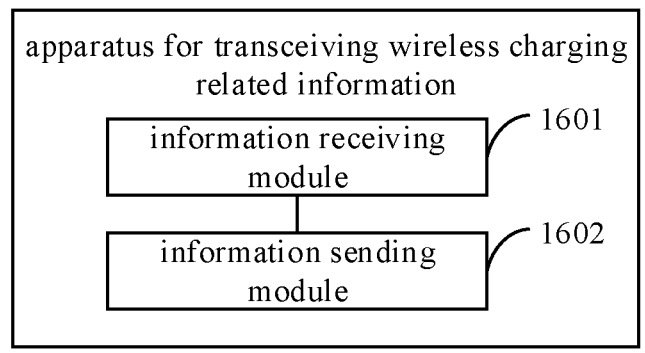
FIG. 16 is a block diagram illustrating an apparatus for transceiving wireless charging related information according to an embodiment of the present disclosure.

FIG. 16 is a flow diagram illustrating an apparatus for transceiving wireless charging related information according to an embodiment of the present disclosure. The apparatus for transceiving wireless charging related information in the embodiment may be applicable to a core network, and the core network may communicate with a first base station and a second base station. The first base station and the second base station may communicate with a terminal.

The terminal includes, but is not limited to, communication devices such as a mobile phone, a tablet computer, a wearable device, a sensor, an internet of things device, and the like. The first and second base stations include, but are not limited to, base stations in a communication system such as 4G base stations, 5G base stations, 6G base stations, and the like.

As illustrated in FIG. 16, the apparatus for transceiving wireless charging related information may include an information receiving module 1601 and an information sending module 1602.

The information receiving module 1601 is configured to receive the wireless charging related information of the terminal and information of the second base station to which the terminal needs to be handed over sent by the first base station.

The information sending module 1602 is configured to send the wireless charging related information to the second base station.

In an embodiment, the information sending module is configured to carry the wireless charging related information in a handover request signaling to send the wireless charging related information to the second base station.

In an embodiment, the information sending module is configured to carry the wireless charging related information in the handover request signaling to send the wireless charging related information to the second base station, in response to the wireless charging related information sent by the first base station being carried in the handover required signaling.

In an embodiment, the information sending module is configured to transparently transmit a source to target transparent container IE to the second base station, in response to the wireless charging related information sent by the first base station being carried in the source to target transparent container IE.

In an embodiment, the apparatus further includes: a configuration receiving module, configured to receive a wireless charging configuration configured for the terminal by the second base station sent by the second base station; and a configuration sending module, configured to send the wireless charging configuration configured for the terminal by the second base station to the first base station.

In an embodiment, the apparatus further includes: a first indication receiving module, configured to receive first indication information sent by the second base station, in which the first indication information is configured to indicate that the second base station does not support performing wireless charging for the terminal, and accepts a handover of the terminal; a first indication sending module, configured to send the first indication information to the first base station.

In an embodiment, the apparatus further includes: a second indication receiving module, configured to receive second indication information sent by the second base station; in which the second indication information is configured to indicate that the second base station does not accept a handover of the terminal, and a reason of not accepting the handover of the terminal is that the second base station does not support performing wireless charging for the terminal; a second indication sending module, configured to send the second indication information to the first base station.

In an embodiment, the second indication sending module is configured to carry the second indication information in a handover preparation failure signaling to send the second indication information to the first base station.

In an embodiment, the wireless charging related information includes at least one of the following: wireless charging capability information of the terminal, a wireless charging configuration configured for the terminal by the first base station, a wireless charging configuration configured for the terminal recommended by the first base station, a wireless charging requirement of the terminal, or a wireless charging state of the terminal.

Figure 17:
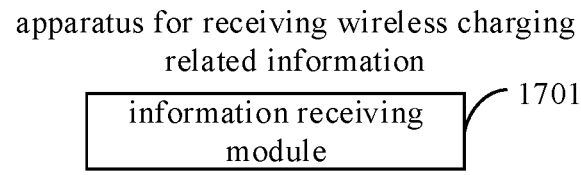
FIG. 17 is a block diagram illustrating an apparatus for receiving wireless charging related information according to an embodiment of the present disclosure.

FIG. 17 is a flow diagram illustrating an apparatus for receiving wireless charging related information according to an embodiment of the present disclosure. The apparatus for receiving wireless charging related information in the embodiment may be applicable to a second base station, and the second base station may communicate with a core network and a terminal.

The terminal includes, but is not limited to, communication devices such as a mobile phone, a tablet computer, a wearable device, a sensor, an internet of things device, and the like. The second base station includes, but is not limited to, a base station in a communication system such as a 4G base station, a 5G base station, a 6G base station, and the like.

As illustrated in FIG. 17, the apparatus for receiving wireless charging related information may include an information receiving module 1701.

The information receiving module 1701 is configured to receive the wireless charging related information of the terminal sent by the core network.

In an embodiment, the apparatus further includes: a first configurating module, configured to configure a wireless charging configuration for the terminal; and a first configuration sending module, configured to send the wireless charging configuration configured for the terminal by the second base station to the core network.

In an embodiment, the wireless charging configuration configured for the terminal by the second base station is carried in a handover request acknowledge signaling.

In an embodiment, the wireless charging configuration configured for the terminal by the second base station is carried in a target to source transparent container IE of the handover request acknowledge signaling.

In an embodiment, the apparatus further includes: a second configurating module, configured to configure a wireless charging configuration for the terminal; and a second configuration sending module, configured to send the wireless charging configuration configured for the terminal by the second base station to the terminal after the terminal is handed over to the second base station.

In an embodiment, the wireless charging configuration configured for the terminal by the second base station is carried in a RRCReconfiguration signaling or a RRCConnectionReconfiguration signaling.

In an embodiment, the apparatus further includes: a first indicating module, configured to send first indication information to the core network; in which the first indication information is configured to indicate that the second base station does not support performing wireless charging for the terminal, and accepts a handover of the terminal.

In an embodiment, the apparatus further includes: a second indicating module, configured to send second indication information to the core network; in which the second indication information is configured to indicate that the second base station does not accept a handover of the terminal, and a reason of not accepting the handover of the terminal is that the second base station does not support performing wireless charging for the terminal.

In an embodiment, the wireless charging related information includes at least one of the following: wireless charging capability information of the terminal, a wireless charging configuration configured for the terminal by the first base station, a wireless charging configuration configured for the terminal recommended by the first base station, a wireless charging requirement of the terminal, or a wireless charging state of the terminal.

With regard to the apparatus in the above embodiments, the specific way that each module performs the operation has been described in detail in the embodiments of the method and will not be elaborated here.

Since the apparatus embodiments basically correspond to the method embodiments, relevant contents can refer to partial description of the method embodiments. The apparatus embodiments described above are merely schematic, in which the modules described as separate components may or may not be physically separated, and the components shown as modules may or may not be physical modules, i.e., they may be located in a single place or may be distributed to a plurality of network modules. Some or all of these modules may be selected according to actual needs to fulfill the purpose of the solution of the embodiments, which can be understood and implemented by those skilled in the art without creative labor.

A communication device is further proposed in the embodiments of the present disclosure, and includes: a processor, a memory configured to store a computer program; in which, the computer program implements the method for sending wireless charging related information of any one of the above embodiments and/or the method for receiving wireless charging related information of any one of the above embodiments when executed by the processor.

A communication device is further proposed in the embodiments of the present disclosure, and includes: a processor, a memory configured to store a computer program; in which, the computer program implements the method for transceiving wireless charging related information of any one of the above embodiments when executed by the processor.

A computer readable storage medium is further proposed in the embodiments of the present disclosure, and is configured to store a computer program; in which, the computer program implements steps of the method for sending wireless charging related information of any one of the above embodiments and/or the method for receiving wireless charging related information of any one of the above embodiments when executed by the processor.

A computer readable storage medium is further proposed in the embodiments of the present disclosure, and is configured to store a computer program; in which, the computer program implements steps of the method for transceiving wireless charging related information of any one of the above embodiments when executed by the processor.

Figure 18:
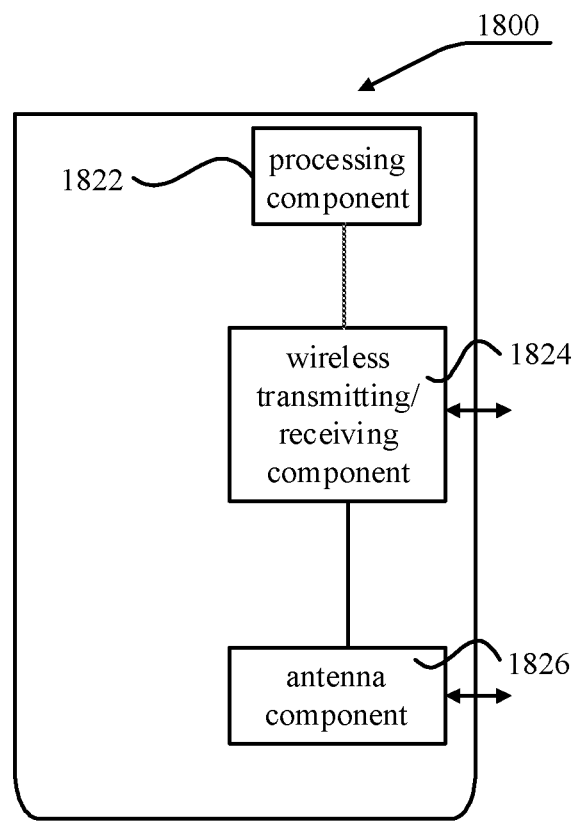
FIG. 18 is a block diagram illustrating an apparatus for sending and/or receiving wireless charging related information according to an embodiment of the present disclosure.

As illustrated in FIG. 18, FIG. 18 is a block diagram illustrating an apparatus 1800 for sending and/or receiving wireless charging related information according to an embodiment of the present disclosure. The apparatus 1800 can be provided as a base station. Referring to FIG. 18, the apparatus 1800 includes a processing component 1822, a wireless transmitting/receiving component 1824, an antenna component 1826, a signal processing portion specific to a wireless interface. The processing component 1822 may further include one or more processors. One of the processors in the processing component 1822 may be configured to implement the method for transceiving wireless charging related information of any of the above embodiments.

Figure 19:
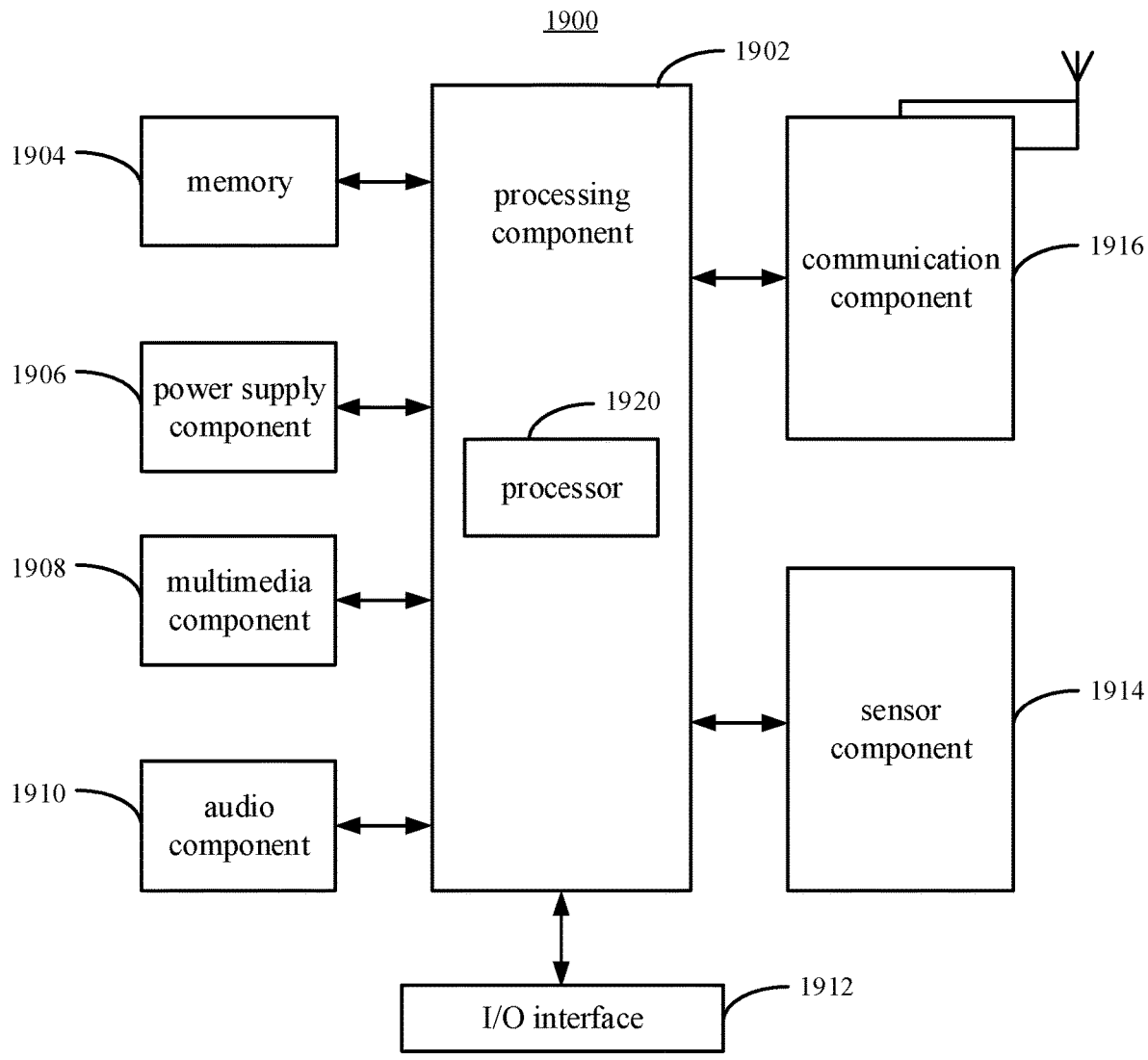
FIG. 19 is a block diagram illustrating a terminal according to an embodiment of the present disclosure.

FIG. 19 is a block diagram illustrating a terminal 1900 according to an embodiment of the present disclosure. For example, the terminal 1900 may be a mobile phone, a computer, a digital broadcasting terminal, a message transceiver device, a game console, a tablet device, a medical device, a fitness device and a personal digital assistant.

As illustrated in FIG. 19, the terminal 1900 may include one or more components: a processing component 1902, a memory 1904, a power supply component 1906, a multimedia component 1908, an audio component 1910, an input/output (I/O) interface 1912, a sensor component 1914, and a communication component 1916.

The processing component 1902 generally controls the whole operation of the terminal 1900, such as the operations related to display, phone call, data communication, camera operation and recording operation. The processing component 1902 may include one or more processors 1920 to perform instructions, to complete all or part of steps of the above interaction with the first base station, the second base station. In addition, the processing component 1902 may include one or more modules for the convenience of interaction between the processing component 1902 and other components. For example, the processing component 1902 may include a multimedia module for the convenience of interaction between the multimedia component 1908 and the processing component 1902.

The memory 1904 is configured to store all types of data to support the operation of terminal 1900. Examples of the data include the instructions of any applications or methods operated on terminal 1900, contact data, phone book data, messages, pictures, videos, etc. The memory 1904 may be implemented by any type of volatile or non-volatile storage devices or their combination, such as a stationary random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 1906 may provide power supply for all components of the terminal 1900. The power supply component 1906 may include a power supply management system, one or more power supplies, and other components related to generating, managing and distributing power for the terminal 1900.

The multimedia component 1908 includes an output interface screen provided between the terminal 1900 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 1908 includes a front camera and/or a rear camera. When the terminal 1900 is in operation mode, such as shooting mode or video mode, the front camera or the rear camera may receive the external multimedia data. Each front camera and rear camera may be a fixed optical lens system or an optical lens system with focal length and optical zoom capacity.

The audio component 1910 is configured as an output and/or input signal. For example, the audio component 1910 includes a microphone (MIC). When the terminal 1900 is in operation mode, such as call mode, record mode, and speech recognition mode, the microphone is configured to receive the external audio signals. The audio signals received may be further stored in the memory 1904 or sent via the communication component 1916. In some embodiments, the audio component 1910 further includes a speaker configured to output an audio signal.

The I/O interface 1912 provides an interface for the processing component 1902 and the peripheral interface module, and the peripheral interface module may be a keyboard, a click wheel, a button, etc. The buttons may include but not limited to a home button, a volume button, a start button and a lock button.

The sensor component 1914 includes one or more sensors, configured to provide various aspects of status assessment for the terminal 1900. For example, the sensor component 1914 may detect the on/off state of the terminal 1900 and the relative positioning of the component. For example, the component is the display and the keypad of the terminal 1900, the sensor component 1914 may also detect the location change of the terminal 1900 or one component of the terminal 1900, the presence or absence of contact between the user and the terminal 1900, the orientation or acceleration/deceleration of the terminal 1900, and the temperature change of the terminal 1900. The sensor component 1914 may include a proximity sensor, which is configured to detect the existence of the objects nearby without any physical contact. The sensor component 1914 may further include a light sensor such as CMOS or CCD image sensor, which is configured to use in imaging applications. In some embodiments, the sensor component 1914 may further include an acceleration transducer, a gyroscope sensor, a magnetic sensor, a pressure sensor or a temperature sensor.

The communication component 1916 may be configured for the convince of wired or wireless communication between the terminal 1900 and other devices. The terminal 1900 may access wireless networks based on communication standard, such as WiFi, 2G or 3G, 4G LTE, 5G NR or their combination. In an exemplary embodiment, the communication component 1916 receives broadcast signals or broadcast-related information from an external broadcast management system via a broadcast channel. In an exemplary embodiment, the communication component 1916 further includes a near field communication (NFC) module to facilitate short-range communication. For example, an NFC module may be implemented based on radio frequency identification (RFID) technology, infrared data association (IRDA) technology, ultra-wideband (UWB) technology, Bluetooth® (BT) technology and other technologies.

In an exemplary embodiment, the terminal 1900 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above steps of interaction with the first base station, the second base station.

In an exemplary embodiment, a non-temporary computer readable storage medium is further provided which includes instructions, such as the memory 1904 including instructions, in which the instructions may be executed by the processor 1920 of the terminal 1900 to complete the above steps of interaction with the first base station, the second base station. For example, the non-transitory computer readable storage medium may be a ROM, a random access memory (RAM), a CD-ROM, a magnetic tape, a floppy disk, an optical data storage device, etc.

Other embodiments of the disclosure will be apparent to those skilled in the art from consideration of the specification and practice of the disclosure disclosed here. The disclosure is intended to cover any variations, uses, or adaptations of the embodiments of the disclosure following the general principles thereof and including such departures from the disclosure as come within known or customary practice in the art. It is intended that the specification and embodiments are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a .

. . ." does not exclude the presence of additional identical elements in the process, method, article or device that comprises the said element.

The above detailed description of the methods and devices provided by the embodiments of the disclosure is provided herein, and specific examples are applied herein to illustrate the principles and implementations of the disclosure, and the above illustrations of the embodiments are only used to assist in the understanding of the methods of the disclosure and the core ideas thereof. Meanwhile, for those skilled in the art, based on the ideas of the disclosure, there will be changes in the specific implementations and the scope of application, and in summary, the contents of the specification should not be construed as a limitation on the disclosure.

The invention claimed is:

1. A method for sending wireless charging related information, performed by a first base station, comprising:
    sending the wireless charging related information of a terminal to a core network, wherein the first base station is performing wireless charging for the terminal, and the wireless charging related information is sent by the core network to a second base station to which the terminal needs to be handed over, and the wireless charging related information is used for the second base station to configure a wireless charging configuration for the terminal based on the wireless charging related information.

2. The method of claim 1, wherein sending the wireless charging related information of the terminal to the core network comprises:
    determining that the terminal performing wireless charging needs to perform cell handover; and
    sending the wireless charging related information of the terminal to the core network.

3. The method of claim 2, further comprising:
    determining the second base station to which the terminal needs to be handed over; and
    sending information of the second base station to the core network.

4. The method of claim 3, further comprising at least one of the following:
    receiving a measure report sent by the terminal, wherein the measure report comprises signal quality information of at least one candidate base station; or obtaining wireless charging capability information of the at least one candidate base station;
    wherein determining the second base station to which the terminal needs to be handed over comprises:
    determining the second base station in the at least one candidate base station based on at least one of the signal quality information of the at least one candidate base station or the wireless charging capability information of the at least one candidate base station.

5. The method of claim 4, wherein obtaining the wireless charging capability information of the at least one candidate base station comprises:
    obtaining the wireless charging capability information of the at least one candidate base station from the terminal or the core network.

6. The method of claim 4, wherein determining the second base station in the at least one candidate base station based on the at least one of the signal quality information of the at least one candidate base station or the wireless charging capability information of the at least one candidate base station comprises:
    determining one or more matched base stations with the wireless charging capability information matching wireless charging capability information of the terminal in the at least one candidate base station; and
    determining the second base station in the one or more matched base stations based on the signal quality information of the one or more matched base stations.

7. The method of claim 2, wherein the wireless charging related information is carried in a handover required signaling.

8. The method of claim 7, wherein the wireless charging related information is carried in a newly added information element (IE) of the handover required signaling; or
    the wireless charging related information is carried in a source to target transparent container IE.

9. The method of claim 2, further comprising:
    receiving the wireless charging configuration configured for the terminal by the second base station and sent by the core network; and
    sending the wireless charging configuration configured for the terminal by the second base station to the terminal.

10. The method of claim 2, further comprising:
    receiving first indication information sent by the core network, wherein the first indication information is configured to indicate that the second base station does not support performing wireless charging for the terminal, and accepts a handover of the terminal.

11. The method of claim 2, further comprising:
    receiving second indication information sent by the core network, wherein the second indication information is configured to indicate that the second base station does not accept a handover of the terminal, and a reason of not accepting the handover of the terminal is that the second base station does not support performing wireless charging for the terminal.

12. The method of claim 1, wherein sending the wireless charging related information of the terminal to the core network comprises:
    sending the wireless charging related information of the terminal to the core network via an interface between the first base station and the core network.

13. The method of claim 1, wherein the wireless charging related information comprises at least one of:
    wireless charging capability information of the terminal;
    a wireless charging configuration configured for the terminal by the first base station;
    a wireless charging configuration configured for the terminal recommended by the first base station;
    a wireless charging requirement of the terminal; or
    a wireless charging state of the terminal.

14. A method for transceiving wireless charging related information, performed by a core network, comprising:
    receiving the wireless charging related information of a terminal and information of a second base station to which the terminal needs to be handed over sent by a first base station that is performing wireless charging for the terminal; and
    sending the wireless charging related information to the second base station, wherein the wireless charging related information is used for the second base station to configure a wireless charging configuration for the terminal based on the wireless charging related information.

15. The method of claim 14, wherein sending the wireless charging related information to the second base station comprises:

carrying the wireless charging related information in a handover request signaling to send the wireless charging related information to the second base station.

16. The method of claim 15, wherein carrying the wireless charging related information in the handover request signaling to send the wireless charging related information to the second base station comprises:
in response to the wireless charging related information sent by the first base station being carried in the handover required signaling, carrying the wireless charging related information in the handover request signaling to send the wireless charging related information to the second base station.

17. The method of claim 14, wherein sending the wireless charging related information to the second base station comprises:
transparently transmitting a source to target transparent container information element (IE) to the second base station, wherein the wireless charging related information sent by the first base station is carried in the source to target transparent container IE.

18. A method for transceiving wireless charging related information, performed by a second base station, comprising:
receiving the wireless charging related information of a terminal sent by a core network, wherein the wireless charging related information is sent to the core network by a first base station that is performing wireless charging for the terminal; and
configuring a wireless charging configuration for the terminal based on the wireless charging related information.

19. The method of claim 18, further comprising:
sending the wireless charging configuration configured for the terminal by the second base station to the core network.

20. The method of claim 19, wherein the wireless charging configuration configured for the terminal by the second base station is carried in a handover request acknowledge signaling.

* * * * *